April 10, 1956 S. A. HAYES 2,741,453
VALVE
Filed Jan. 19, 1953

INVENTOR.
STANLEY A. HAYES
BY
James B Christie
ATTORNEY

United States Patent Office 2,741,453
Patented Apr. 10, 1956

2,741,453

VALVE

Stanley A. Hayes, Pasadena, Calif.

Application January 19, 1953, Serial No. 331,881

6 Claims. (Cl. 251—298)

This invention concerns an improved valve for control of a fluid stream. It is particularly useful in spray guns of the type which utilize a moving stream of carrier liquid as a means of drawing other substances into the stream in predetermined proportion, mixing and ejecting them with the carrier liquid. In such devices, it is desirable to provide a valve in the body of the spray gun itself for regulation of the carrier stream. Such a valve is most convenient if located and designed so it can be operated by a thumb or finger of the hand holding the spray gun. It must also be simple and rugged in construction, having few parts, requiring little or no maintenance and be of such composition that it will not deteriorate on contact with the carrier liquid or the substances which are sucked into the carrier liquid.

The present invention meets these needs by providing a simple cam-type valve which may be located in the body of a spray gun, and be adjusted by a member of the hand holding the gun. This valve has several unique features, one being the design of the chamber within which the cam-type valve operates. In its preferred form, the chamber is in the form of a right cylinder with inlet and outlet ports located at opposite sides of the cylinder. A depression is formed in the side of the cylinder extending parallel to its axis for its full length. In side view the depression resembles a segment of a circle, and is centered on the outlet port. The stem of the cam-valve is positioned so that there is no interference with the flow of liquid to the outlet port when the dimension of least eccentricity (the shortest distaance from the stem to the edge of the cam) coincides with the line joining the stem and the outlet port. When the valve is turned with its dimension of greater eccentricity (the longest distance from the stem to the edge of the cam) toward the outlet port, the cam is forced both mechanically and by hydraulic pressure into the depression, stopping the flow. This depression permits wider contact of wall and cam, while deforming the cam much less than if the wall were a perfect cylinder. Positioning the cam at intermediate positions will partly obstruct the stream. The cam itself is a plug made of a resilient material so that it will deform and conform to the wall of the chamber when pressed against it. The plug may assume many shapes, such as a prism, a cylinder or a sphere, as examples.

There is but one moving part to this valve, and no lubrication is needed, since the carrier liquid itself provides sufficient lubrication between the cylinder wall and the small portion of the cam which contacts it during part of its rotation. When constructed as described below, the valve is extremely rugged and has long life.

The operation and design of the presently preferred embodiment of this invention will be completely understood from the following detailed description with further reference to the accompanying drawings, in which.

Figure 1:
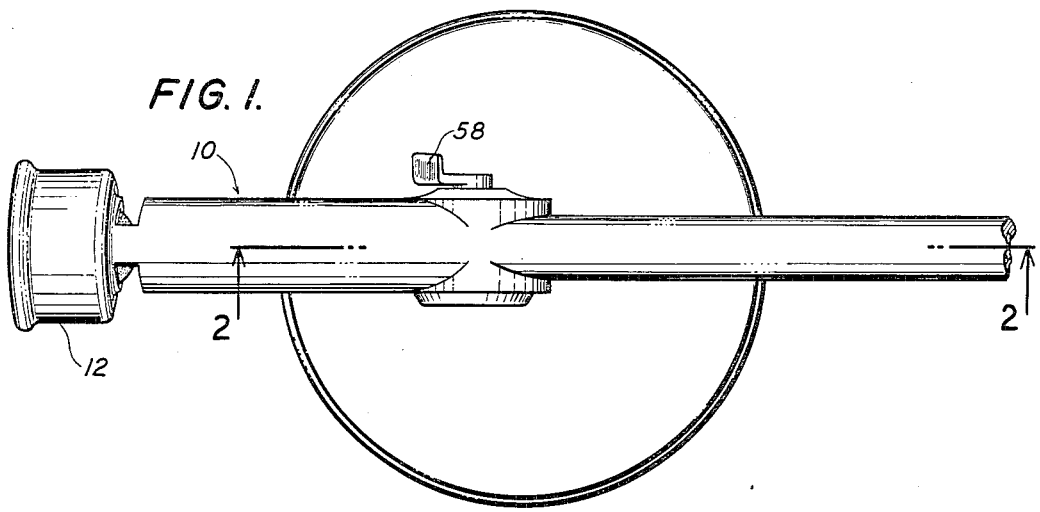
Fig. 1 is a top view of a spray gun having a valve constructed according to the present invention.

The spray gun body 10 is part of a gun which uses a moving stream of carrier liquid (say water) to draw a proportional amount of some other substance (say a liquid insecticide) into the carrier liquid for mixing and spraying. Such a gun provides a conventional coupling means 12 to a source of carrier liquid, such as a garden hose, and an inlet conduit 14 leading from the coupling to the valve 15 of the present invention and extending longitudinally. An outlet conduit 16 is concentric with the inlet conduit and leads from the valve to an eductor comprising a throat 18, a mixing chamber 20, a nozzle 22 and a deflector 24 for spraying the mixed components and carrier liquid. A conduit or side leg 26 interconnects the mixing chamber with the source of substances (say liquid insecticide) to be sucked into the carrier stream in fixed proportions. The base of the body has threads 28 which are adapted to be screwed onto the top of a container (say a glass jar) holding the substances.

Figure 2:
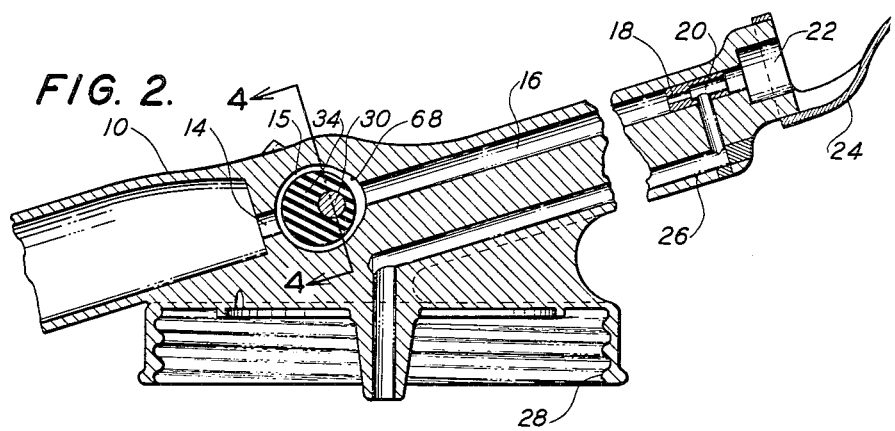
Fig. 2 is an elevation, partly in section, taken along line 2—2 of Fig. 1.
Figure 3:
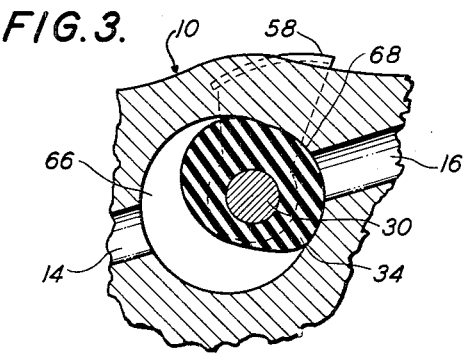
Fig. 3 is a fragmentary sectional view of the valve in its closed position, taken along the line 2—2.
Figure 4:
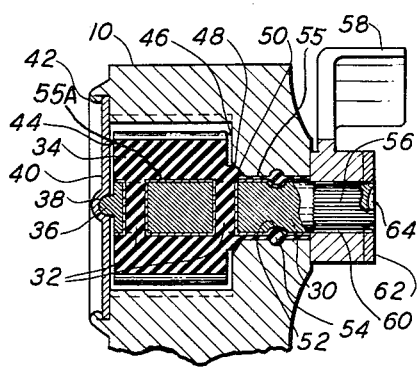
Fig. 4 is a fragmentary sectional view taken along line 4—4 of Fig. 2.

Considering the construction of the valve itself as shown in Figs. 2, 3, and 4, a metal stem 30, having two anchoring holes 32 drilled radially is molded into a cam 34 of cylindrical shape made of a deformable material which will not swell or disintegrate with constant or intermittent exposure to the carrier liquid. When water is the carrier liquid, neoprene rubber (i. e., rubber containing the condensation product of polymerized chloroprene) has been found to be satisfactory. When neoprene is cast around the stem, the holes 32 are filled with the neoprene and provide, in effect, two pins which prevent relative rotation between the cam and the stem.

One end of the stem terminates in a knob 36, which fits into a dimple 38 in a round retaining plate 40, thereby providing support for one end of the stem. The retaining plate is perpendicular to the stem and is held in place by a rolled or hammered lip 42 formed from the valve body. A small clearance or gap 44 is provided to eliminate drag between the top of the cam and the retaining plate. A similar clearance or gap 46 eliminates drag between the cam and the other end of the cylinder. To provide a liquid seal at this latter end, a small shoulder 48, concentric with the stem is moulded as part of the cam and seats against a ledge 50 on the valve body. As a further liquid seal, the stem has an annular depression 52 into which an annular O ring 54 is moulded as an integral part of an extension 55 formed integrally with the cam, the extension being disposed along that part of the stem passing through the valve body. All moulding may be advantageously done in one operation, and a tight seal between the neoprene (or other material) is facilitated by applying a coat of adhesive 55A to the stem prior to the moulding operation. At the end of the stem extending beyond the valve body, axial male splines 56 engage with matching female splines of a handle 58 and fix the handle to the stem. If desired, a flat side 60 may be provided at the splined end of the stem to index the relative position of cam and handle. The handle is permanently affixed to the stem by means of a washer 62 which is placed over the end of the stem and held there by a dimple 64 in the end of the stem, so that the stem is expanded against the washer.

The cam-valve as described is mounted inside a chamber 66 in the body of the spray gun. This chamber is in the approximate shape of a right cylinder, and the stem is mounted parallel to the axis of this cylinder, but eccentrically, being closest to the outlet port. One sector of the chamber is "dished out" to form a lens-shaped depression 68. This depression extends the length of the axis of the cylinder, is parallel to it, and is centered on the outlet port. The edges of intersection of the cylinder and the depression are rounded so as not to cut the deformable cam as it passes over them.

The operation of the valve is shown in Figs. 2 and 3. The stem is moulded into the deformable cam parallel to, but distant from the axis of the cam so that an eccentric action is provided. Fig. 2 shows the valve in its open position, the dimension of lesser eccentricity (that is the shortest distance from the stem to the edge of the cam) coinciding with the line joining the stem and the outlet port. In this position, liquid may flow around the cam and through the outlet port. Fig. 3 shows the valve in a closed position. The cam has been turned so that it has been pressed into the depression and filled it. This arrangement offers advantages over a simple cam in a regular cylinder. The closing of the hole does not depend entirely on deformation of the cam, since the curvature of the depression is more nearly that of the cam than is the wall of the main chamber. In the closed position, hydraulic force will tend to keep the valve shut since there is an equal pressure on all sides of the cam. The valve may therefore be left closed and unattended.

I claim:

1. In a valve, the combination which comprises a body having a chamber and inlet and outlet conduits leading respectively to and from the chamber, at least the outlet conduit being smaller in cross section than the chamber, a rotatable valve stem projecting into the chamber and transverse to the outlet conduit and, a resilient plug eccentrically and rigidly attached to the stem, so that as the stem is rotated the plug covers the wall of the chamber around the intersection of the wall with the outlet conduit and seals the outlet conduit from the chamber, the plug having an extension formed integrally therewith and extending along the stem through the valve body to form a sliding seal between the body and the valve stem.

2. In a valve, the combination which comprises a body having a chamber of approximately cylindrical shape and inlet and outlet conduits leading respectively to and from the chamber, at least the outlet conduit being smaller in cross section than the chamber and connected to its side, a rotatable valve stem projecting into the chamber from the end, a resilient plug of approximately cylindrical shape eccentrically and rigidly attached to the stem so that as the stem is rotated the plug covers the wall of the chamber around the intersection of the wall with the outlet conduit and seals the outlet conduit from the chamber, the plug having an extension formed integrally therewith and extending along the stem through the valve body to form a sliding seal between the body and the valve stem, and means for rotating the stem.

3. In a valve, the combination which comprises a body having a chamber of approximately cylindrical shape and inlet and outlet conduits leading respectively to and from the chamber, at least the outlet conduit being smaller in cross section than the chamber, the chamber having a shallow curved longitudinal depression in its wall whose axis is parallel to that of the chamber and which depression extends on both sides of the intersection of the chamber wall and the outlet conduit to form a recessed valve seat, a rotatable valve stem projecting into the chamber, a resilient plug of approximately cylindrical shape eccentrically and rigidly attached to the stem, so that as the stem is rotated the plug moves into the recessed seat and covers the wall of the chamber around the intersection of the wall with the outlet conduit and seals the outlet conduit from the chamber, the plug having an extension formed integrally therewith and extending along the stem through the valve body to form a sliding seal between the body and the valve stem, and means for rotating the stem.

4. Apparatus according to claim 3 wherein the resilient plug includes a shoulder at one end and an annular ring molded in an extension of the plug disposed around the stem, the plug, shoulder, and ring being integrally formed.

5. In a valve, the combination which comprises a body having a chamber of approximately cylindrical shape and inlet and outlet conduits leading respectively to and from the chamber, at least the outlet conduit being smaller in cross section than the chamber, the chamber having a shallow curved longitudinal depression in its wall whose axis is parallel to that of the chamber and which depression extends on both sides of the intersection of the chamber wall and the outlet conduit and forms a recessed valve seat, a rotatable valve stem having a plurality of transverse holes projecting into the chamber, and a resilient plug of approximately cylindrical shape eccentrically and rigidly attached to the stem, the resilient material filling the holes in the stem, so that as the stem is rotated the plug goes into the recessed seat and covers the wall of the chamber around the intersection of the wall with the outlet conduit and seals the outlet conduit from the chamber, the plug having an extension formed integrally therewith and extending along the stem through the valve body to form a sliding seal between the body and the valve stem.

6. In a valve, the combination which comprises a body having a chamber of approximately cylindrical shape, and inlet and outlet conduits leading respectively to and from the chamber, at least the outlet conduit being smaller in cross section than the chamber, a rotatable valve stem projecting into the chamber with its axis parallel to that of the chamber, a resilient plug of approximately cylindrical shape and of smaller cross section than the chamber eccentrically and rigidly attached to the stem with its axis parallel to but offset from that of the stem, so that as the stem is rotated the plug covers the wall of the chamber around the intersection of the wall with the outlet conduit and seals the outlet conduit from the chamber, the plug having an extension formed integrally therewith and extending along the stem through the valve body to form a sliding seal between the body and the valve stem, and means for rotating the stem located externally of the chamber.

References Cited in the file of this patent

UNITED STATES PATENTS

| | | |
|---|---|---|
| 1,283,469 | Clas | Nov. 5, 1918 |
| 1,653,202 | Bubla | Dec. 20, 1927 |
| 2,165,874 | Sauls | July 11, 1939 |
| 2,194,263 | Allen | Mar. 19, 1940 |
| 2,431,593 | Strike | Nov. 25, 1947 |
| 2,643,089 | Mueller | June 23, 1953 |

FOREIGN PATENTS

| | | |
|---|---|---|
| 19,479 | Great Britain | 1898 |
| 106,847 | Germany | 1899 |